United States Patent
Chang et al.

(10) Patent No.: US 10,613,583 B2
(45) Date of Patent: Apr. 7, 2020

(54) BATTERY INSTALLATION SYSTEM AND METHOD THEREFOR

(71) Applicant: DELL PRODUCTS, LP, Round Rock, TX (US)

(72) Inventors: Yao-Tsung Chang, Taipei (TW); Chia-Min Sun, Taipei (TW); Cheng-Hung Chen, New Taipei (TW)

(73) Assignee: Dell Products, L.P., Round Rock, TX (US)

( * ) Notice: Subject to any disclaimer, the term of this patent is extended or adjusted under 35 U.S.C. 154(b) by 272 days.

(21) Appl. No.: 15/858,835

(22) Filed: Dec. 29, 2017

(65) Prior Publication Data
US 2019/0204869 A1   Jul. 4, 2019

(51) Int. Cl.
*H01M 2/10* (2006.01)
*F16B 11/00* (2006.01)
(Continued)

(52) U.S. Cl.
CPC .......... *G06F 1/1635* (2013.01); *G06F 1/1656* (2013.01); *H01M 2/1066* (2013.01); *B29C 65/4825* (2013.01); *B29C 65/5057* (2013.01); *B29C 65/562* (2013.01); *B29C 65/72* (2013.01); *B29C 65/76* (2013.01); *B29C 65/8238* (2013.01);
(Continued)

(58) Field of Classification Search
CPC .... H01M 2/10; H01M 2/1016; H01M 2/1022; H01M 2/1027; H01M 2/1061; H01M 2/1066; H01M 2/1072; H01M 2/1077; H01M 2/1083; F16B 11/006; Y02E 10/47; Y10T 156/10; Y10T 29/49108; Y10T 29/49826; Y10T 29/49963; G06F 1/1656; G06F 1/1648; G06F 1/1635; G06F 1/183; G06F 1/188; B60R 16/04; B29C 65/00; B29C 65/48; B29C 65/4825; B29C 65/50; B29C 65/5057; B29C 65/56; B29C 65/561; B29C 65/562; B29C 65/564; B29C 65/565; B29C 65/58; B29C 65/72; B29C 65/76; B29C 65/82; B29C 65/8207; B29C 65/8238; B29C 66/00; B29C 66/20; B29C 66/21; B29C 66/40; B29C 66/41; B29C 66/43; B29C 66/47; B29C 66/472; B29C 66/474; B29C 66/742
USPC ......... 156/60, 64, 66, 91, 92, 281, 290, 292, 156/297, 299, 300, 303.1; 429/100, 163, 429/186, 187; 29/428, 464, 466, 469, 29/525.01, 525.02, 525.11, 525.13
See application file for complete search history.

(56) References Cited

U.S. PATENT DOCUMENTS

3,956,022 A * 5/1976 Fox ..................... H01M 2/1005
429/187
6,232,013 B1 * 5/2001 Clarke .................. H01M 2/105
29/623.1
(Continued)

*Primary Examiner* — Philip C Tucker
*Assistant Examiner* — Brian R Slawski
(74) *Attorney, Agent, or Firm* — Larson Newman, LLP (57) ABSTRACT

A system includes a chassis assembly, a first boss component secured to the chassis assembly, and a second boss component secured to the chassis assembly. A first tab-bracket is secured to the first boss component and a second tab bracket is secured to the second boss component. Each tab-bracket includes a portion having adhesive applied thereon. A battery is affixed to the adhesive at the first tab-bracket and to the adhesive at the second tab-bracket after the tab-brackets are secured to the boss components.

20 Claims, 9 Drawing Sheets

(51) Int. Cl.
*G06F 1/16* (2006.01)
*B29C 65/00* (2006.01)
*B29C 65/48* (2006.01)
*B29C 65/50* (2006.01)
*B29C 65/56* (2006.01)
*B29C 65/72* (2006.01)
*B29C 65/76* (2006.01)
*B29C 65/82* (2006.01)
*B32B 37/00* (2006.01)

(52) U.S. Cl.
CPC ............ *B29C 66/43* (2013.01); *B29C 66/474* (2013.01); *B29C 66/742* (2013.01); *F16B 11/006* (2013.01); *H01M 2220/30* (2013.01)

(56) References Cited

U.S. PATENT DOCUMENTS

| | | | |
|---|---|---|---|
| 6,357,534 B1 | 3/2002 | Buetow et al. | |
| 9,786,881 B2 | 10/2017 | Tazawa et al. | |
| 2009/0052130 A1* | 2/2009 | Hsieh | G06F 1/1616 361/679.31 |
| 2013/0029212 A1* | 1/2013 | Hong | H01M 2/021 429/179 |
| 2013/0207912 A1* | 8/2013 | Tso | G06F 3/041 345/173 |
| 2015/0352827 A1* | 12/2015 | Bye | B32B 38/1808 156/297 |

\* cited by examiner

BATTERY INSTALLATION SYSTEM AND METHOD THEREFOR

FIELD OF THE DISCLOSURE

This disclosure generally relates to information handling systems, and more particularly relates to battery installation in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A system includes a chassis assembly, a first boss component secured to the chassis assembly, and a second boss component secured to the chassis assembly. A first tab-bracket is secured to the first boss component, and a second tab-bracket is secured to the second boss component. Each tab-bracket includes a portion having adhesive applied thereon. A battery is affixed to the adhesive at the first tab-bracket and to the adhesive at the second tab-bracket after the tab-brackets are secured to the boss components.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Mobile information handling systems typically include a rechargeable battery to provide power to the system when mains power is unavailable. The battery, often referred to as a battery pack, can include more than one individual cells that are housed in a plastic enclosure. The battery enclosure typically includes mounting tabs to facilitate attaching the battery to a chassis or printed circuit board assembly included inside the mobile system. For example, the mounting tabs can be defined during an injection molding process used to manufacture the battery housing. In particular, the mounting tabs can include an opening to receive a screw that engages with a threaded boss provided at the chassis assembly. The traditional battery design described above has multiple deficiencies. For example, the molded plastic mounting tabs are prone to breaking if the mobile system is dropped. In addition, boss locations on the chassis assembly must correspond to the positions of the mounting tabs of the battery. Because the design and internal layout of mobile information handling systems can vary considerably, it is common that different models of mobile devices require a specific battery that is physically compatible with the device, but incompatible with another model.

FIGS. 1-9 illustrate techniques for improving on the traditional battery design described above. In an embodiment, the molded plastic mounting tabs are omitted and discreet metal tab-brackets are used to mount the battery within the system. Accordingly, tab materials and properties can be selected to provide compliance with the specific free fall drop specifications of each system. In addition, the physical location of the tab-brackets can be selected based on optimal boss locations at the system chassis of each system. A particular battery can be utilized in a variety of system models, thereby leveraging the costs of battery design and regulatory certification. Fewer battery models required across a product line of mobile systems can simplify component inventory management and supply chain distribution, and can reduce costs through economy of scale.

Figure 1A:
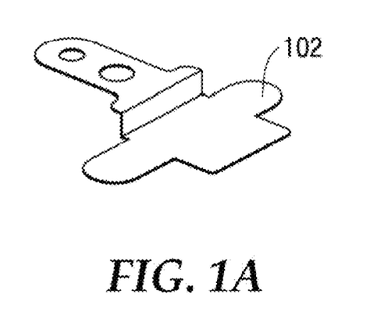
FIG. 1a is a perspective view of a tab-bracket to facilitate mounting a battery at an information handling system according to a specific embodiment of the present disclosure.

FIG. 1a shows a tab-bracket 102 to facilitate mounting a battery at an information handling system according to a specific embodiment of the present disclosure. Tab-bracket 102 is manufactured out of metal and includes a portion that will ultimately interface with a battery, and another portion to facilitate attaching the tab-bracket to a corresponding boss provided at the chassis assembly of an information handling system. For example, tab-bracket 102 includes an opening to receive a screw to attach the tab-bracket to a boss, and another opening to couple with an alignment pin included at the boss. One of skill will appreciate that the illustrated design for attaching the tab-bracket to a corresponding boss is but one example, and other designs can be utilized without departing from the present disclosure. For example, a tab-bracket can include a single opening to receive a screw or another type of fastener, and the corresponding boss can include structure that provides alignment of the attached tab-bracket. The type of metal and the thickness of the metal used to fabricate the tab-bracket can be selected based on the product specifications of the particular system utilizing the tab-bracket. For example, a tab-bracket can be manufactured out of cold rolled carbon steel, hot dip galvanized steel, carbon tool steel, brass, and the like, the particular material selected based on the physical requirements of the tab-bracket and the specifications of an associated information handling system. The dimensions of the tab-bracket can be selected based on the particular requirements of the information handling system. For example, the surface area of the tab-bracket or the portion of the tab-bracket that is to interface with the battery can be increased to allow application of additional adhesive, as described below. Furthermore, fewer tab-brackets may be required to mount a battery at an information handling system if one or more tab-brackets provide additional area for contacting the battery.

Figure 1B:
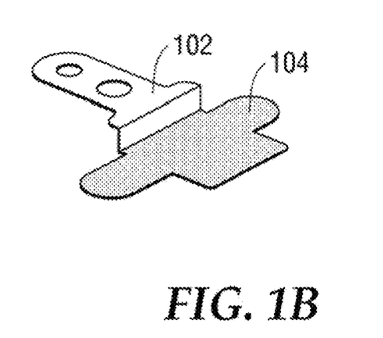
FIG. 1b is a perspective view illustrating application of an adhesive to the tab-bracket of FIG. 1a according to a specific embodiment of the present disclosure.
Figure 1C:
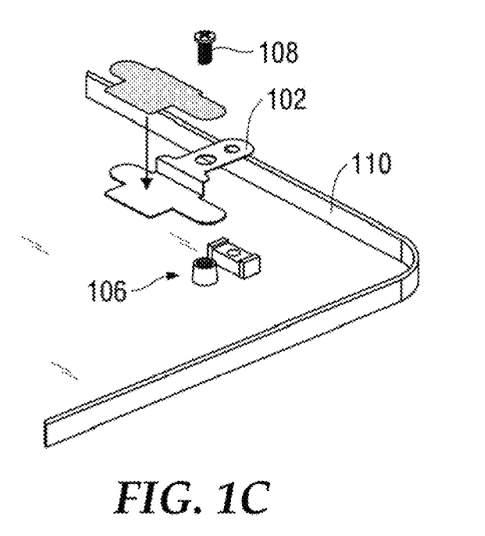
FIG. 1c is a perspective view illustrating fastening the tab-bracket of FIG. 1 to a boss at a chassis assembly according to a specific embodiment of the present disclosure.

FIG. 1b shows application of an adhesive 104 to the tab-bracket 102 of FIG. 1a according to a specific embodiment of the present disclosure. The adhesive is applied to the portion of tab-bracket 102 that is to contact the battery. Adhesive 104 can be applied during the manufacturing of the tab-bracket, applied prior to assembly of an information handling system, or applied to the tab-brackets after the brackets are installed at bosses at the system chassis. A particular adhesive can be selected based on the physical demands and specification of the information handling system. For example, the adhesive can include an acrylic foam tape, a conformable double coated tape, epoxy, cyanoacrylate, and the like. In an embodiment, a protective plastic film can be applied over the adhesive, and removed prior to installing the battery onto the tab-bracket. FIG. 1c shows fastening tab-bracket 102 to a boss at a chassis assembly according to a specific embodiment of the present disclosure. In particular, FIG. 1c shows attaching tab-bracket 102 to a boss 106 using a threaded fastener, such as a screw 108. For example, the boss component can be threaded to engage threads of screw 108. The boss 106 has previously been secured to the chassis assembly using any means suitable.

Figure 2A:
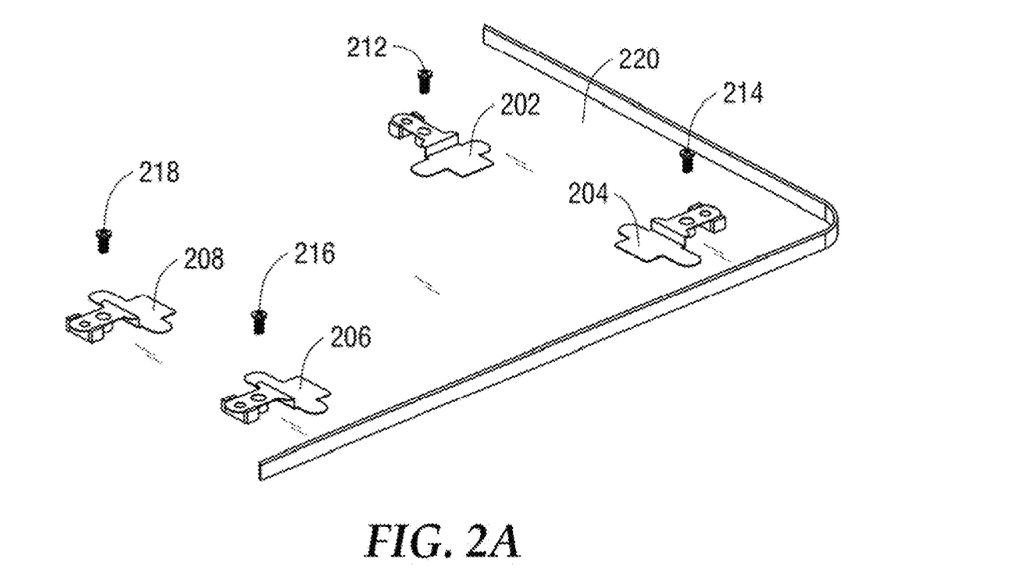
FIGS. 2a, 2b, 2c, and 2d are perspective views illustrating installation and removal of a battery at an information handling system according to a specific embodiment of the present disclosure.
Figure 2B:
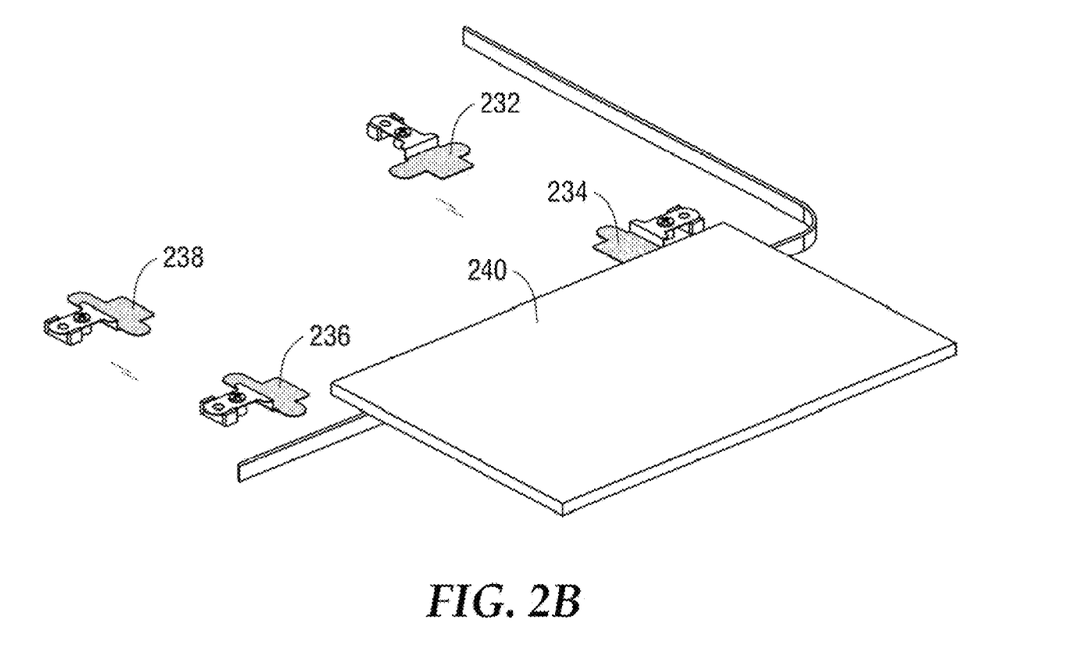
Figure 2C:
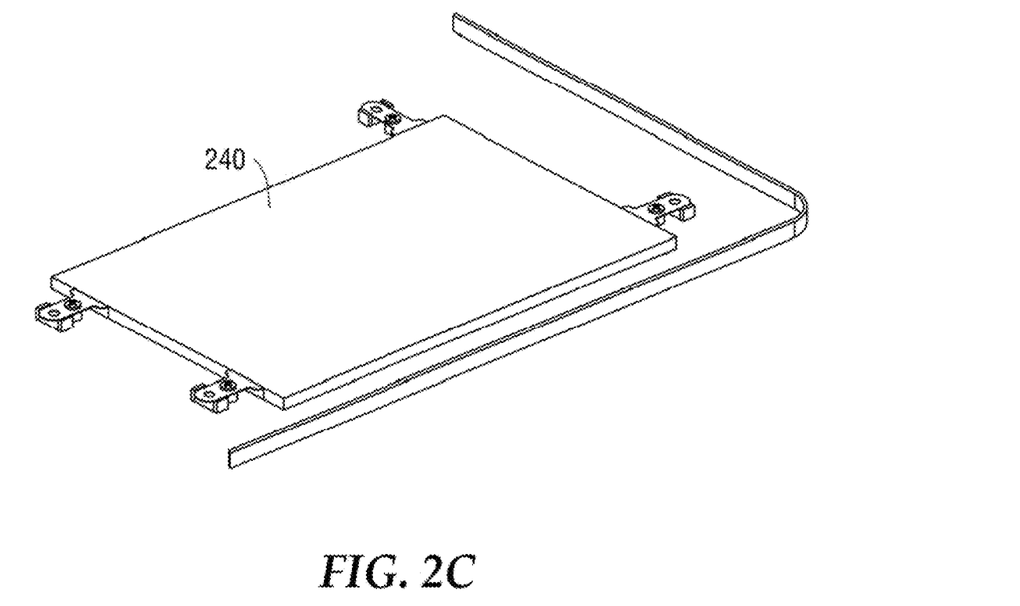
Figure 2D:
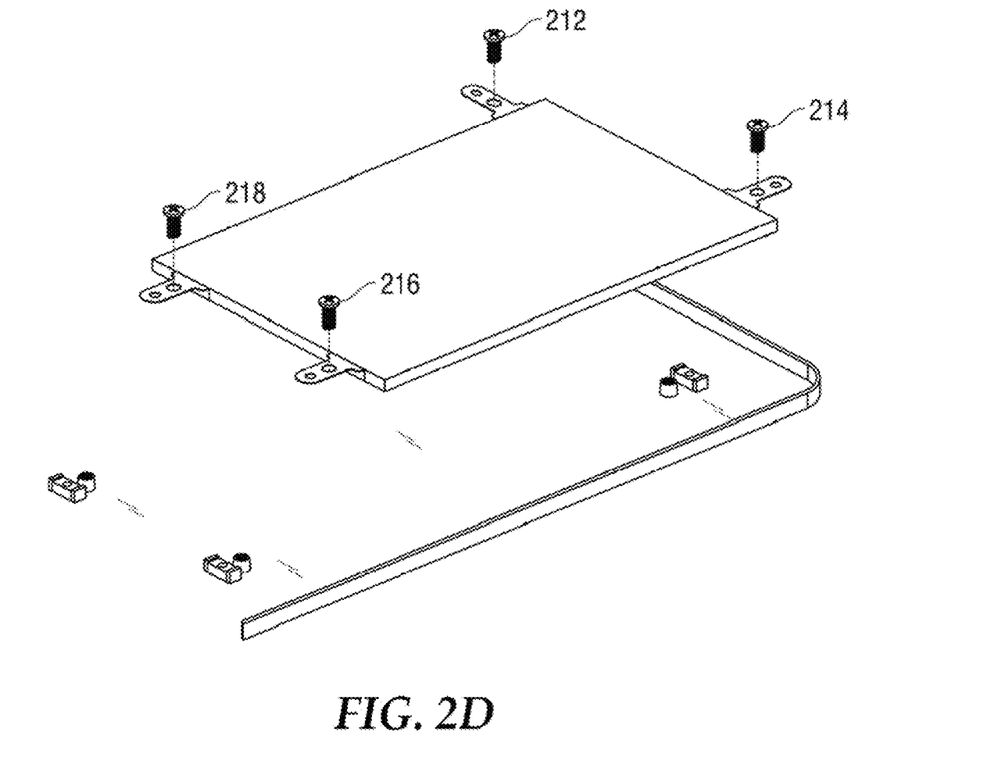

FIGS. 2a, 2b, 2c, and 2d show installation and removal of a battery at an information handling system according to a specific embodiment of the present disclosure. At FIG. 2a, tab-brackets 202, 204, 206, and 208 are each attached to corresponding bosses at a chassis assembly 220 of an information handling system using screws 212, 214, 216, and 218, respectively. While four tab-brackets and associated bosses are shown, one of skill will appreciate that a fewer or a greater number of brackets can be utilized to secure a battery to chassis assembly 220. At FIG. 2b, adhesive 232, 234, 236, and 238 is applied to tab surfaces of each of the tab-brackets, respectively, and battery 240 is readied for incorporation onto assembly 220. As described above, adhesive 232-238 can be applied to tab-brackets 202-208 before the brackets are installed at chassis assembly 220, or after the brackets are installed. At FIG. 2c, battery 240 is brought into alignment and contact with tab-brackets 202-208 and pressure is applied to the battery to securely affix the battery to the adhesive at each of the brackets. Depending on the type of adhesive utilized, the chassis and attached battery can be maintained at rest to allow the adhesive to cure and/or fully bind battery 240 to chassis assembly 220. FIG. 2d shows removal of battery 240 from chassis assembly 220 in the event that battery 240 must be replaced or removed for recycling. To remove battery 240 from chassis 220, screws 212-218 are removed, freeing the battery from the chassis bosses. Tab-brackets 202-208 remain attached to battery 240 after removal from the information handling system.

Figure 3A:
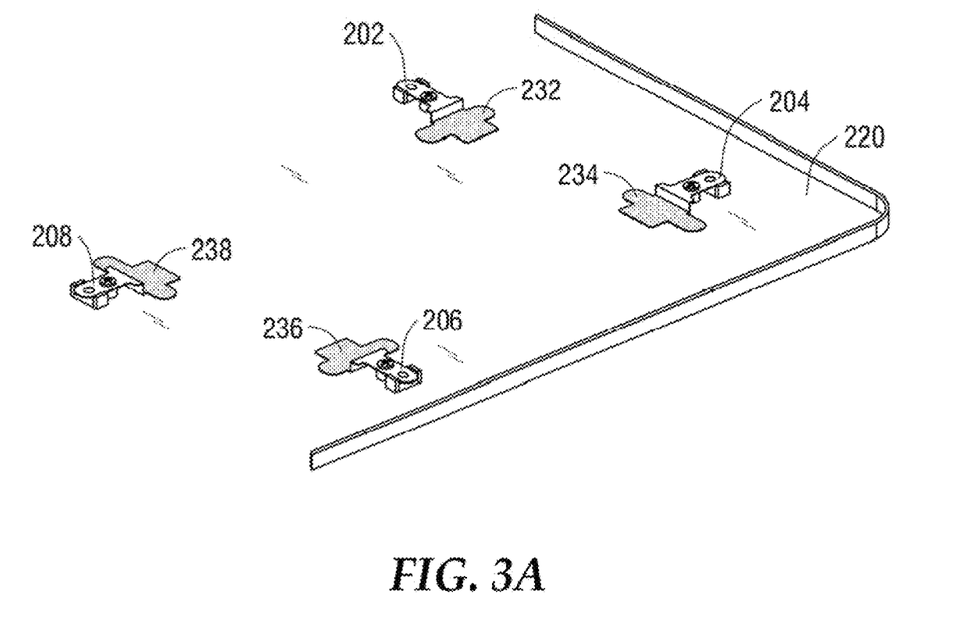
FIGS. 3a and 3b are perspective views illustrating installation of a battery at an information handling system according to another embodiment of the present disclosure.
Figure 3B:
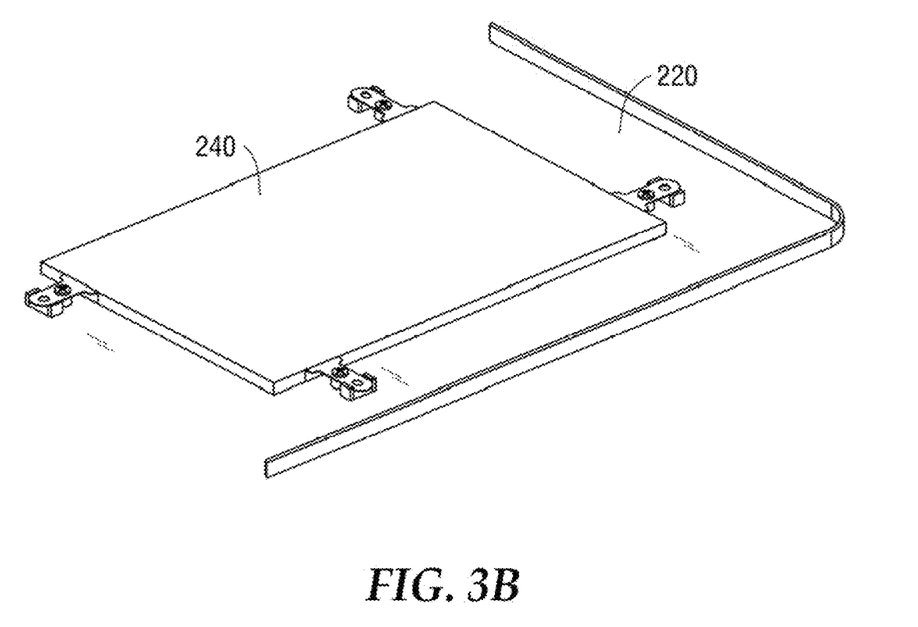

FIGS. 3a and 3b show installation of a battery at an information handling system according to another embodiment of the present disclosure. In particular, FIGS. 3a and 3b illustrate selecting alternative locations for installing tab-brackets based on optimal boss locations at the chassis assembly. The location of boss 236 at FIG. 3a is different than the location of boss 236 at FIG. 2a, but the set of bosses support mounting the same battery component 240 utilized in the information handling system of FIG. 2a. Accordingly, a single battery type can be employed in two or more product models. At FIG. 3a, tab-brackets 202, 204, 206, and 208 are each attached to corresponding bosses at a chassis assembly 220 of an information handling system. Adhesive 232, 234, 236, and 238 is applied to the tab-brackets either before or after the tab-brackets are secured to the corresponding bosses. At FIG. 3b, battery 240 is brought into alignment and contact with tab-brackets 202-208 and pressure is applied to the battery to securely affix the battery to the adhesive at each of the tab-brackets.

Figure 4:
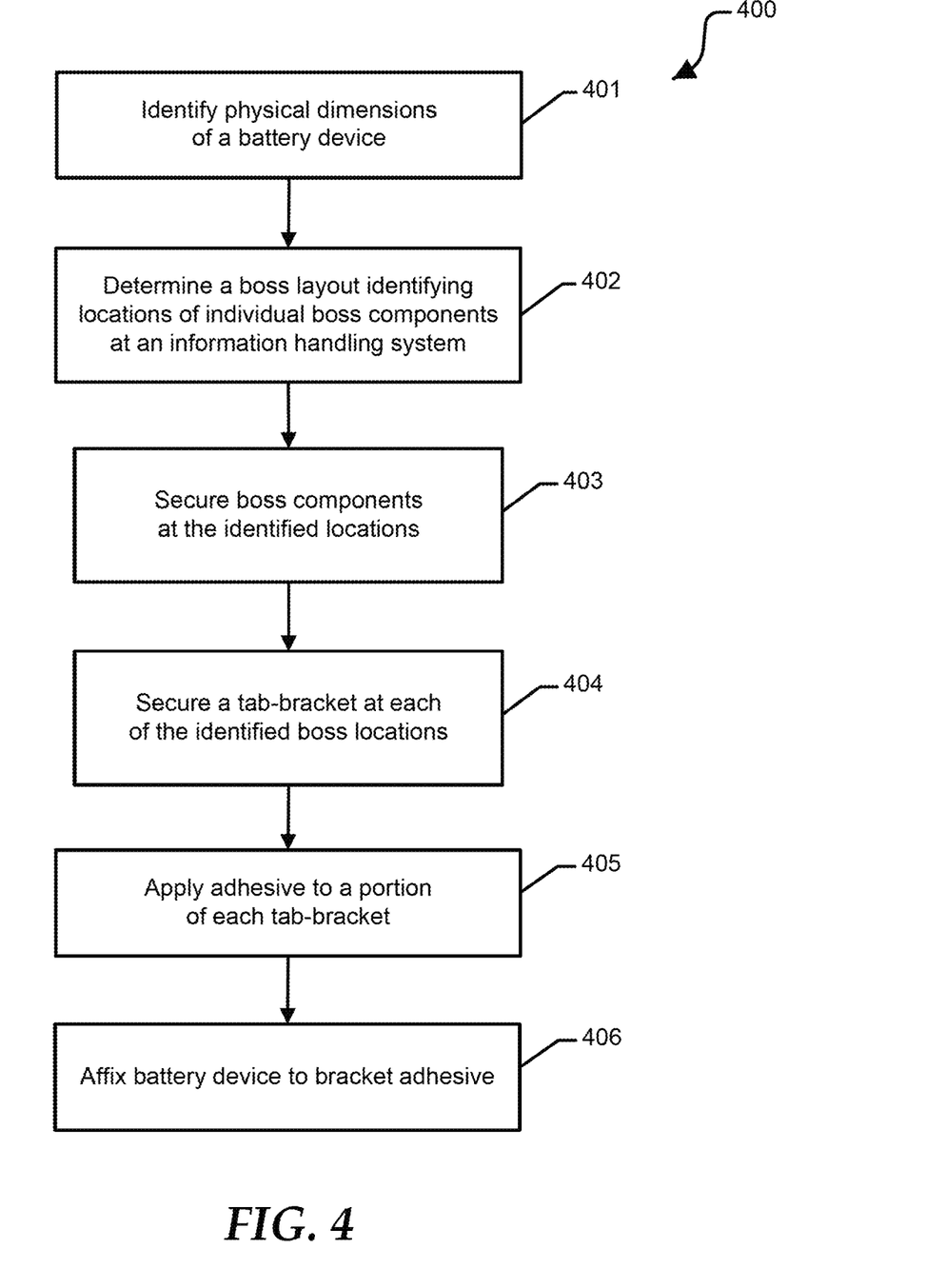
FIG. 4 is a flow diagram of a method for mounting a battery at an information handling system according to a specific embodiment of the present disclosure.

FIG. 4 shows a method 400 for mounting a battery at an information handling system according to a specific embodiment of the present disclosure. At block 401, the physical dimensions of a battery device are identified. AT block 402, a boss layout identifying locations of individual boss components at an information handling system is determined. The location of the boss components can be identified in concert with the design and layout of other components of an information handling system, the layout optimizing manufacturing efficiency, power distribution, physical ruggedness, and the like. For example, it may be desired to use four tab-brackets to mount a battery, one tab-bracket located on each side of the battery. Based on the location of other components and the specific dimensions of the chassis assembly, a location of each boss can be selected that optimizes mounting of the battery having the particular physical dimensions.

At block 403, individual bosses are secured to the chassis assembly at each of the identified locations of the boss layout. At block 404, a tab-bracket is secured at each of the boss components. At block 405, an adhesive is applied to a portion of each tab-bracket that will make contact with the battery. AT block 406, a battery is affixed to the adhesive at each of the tab-brackets. The layout and number of tab-brackets utilized to mount a battery at a chassis assembly can vary based on the physical specifications of the information handling system, manufacturing costs, costs to replace the battery, and the like. In an embodiment, the boss layout can include four tab-brackets arranged so that one tab-bracket is provided on each of the four sides of the battery. One of skill will appreciate that a lesser or greater number of tab-brackets can be employed.

Figure 5:
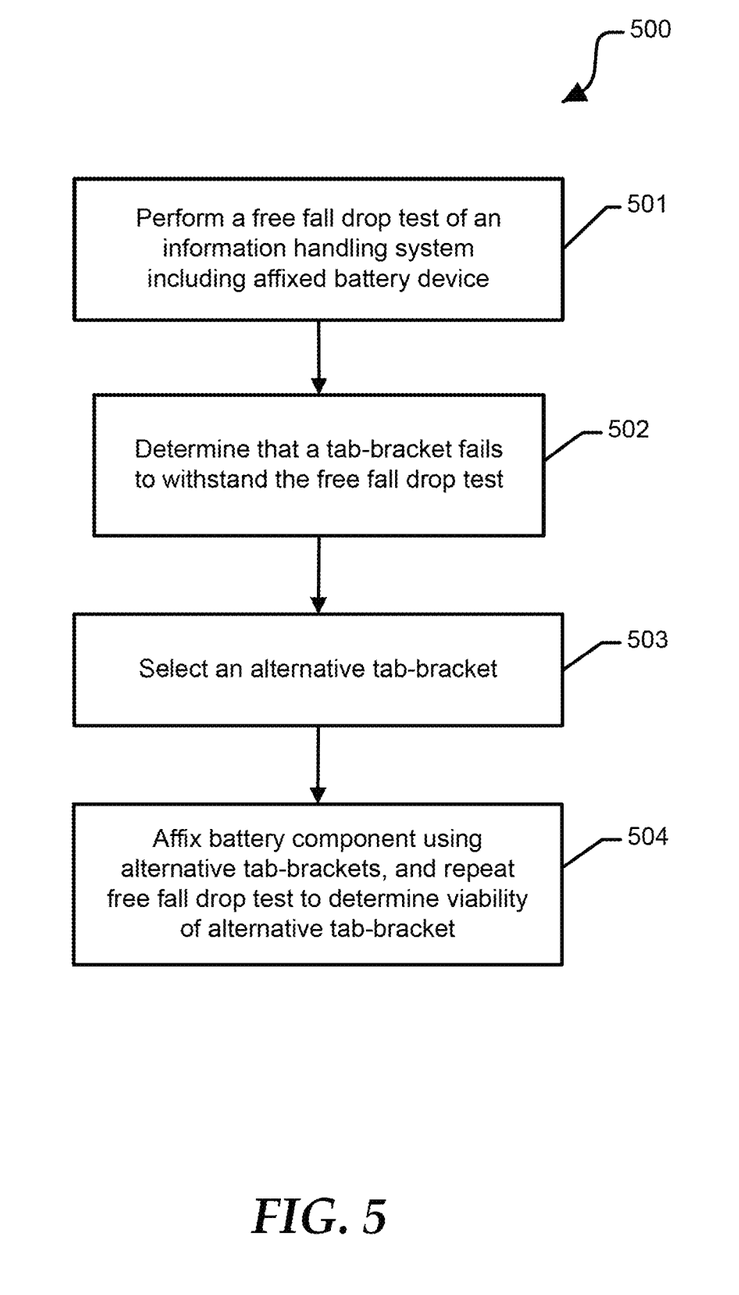
FIG. 5 is a flow diagram of a method for selecting appropriate tab-brackets for mounting a battery at an information handling system according to a specific embodiment of the present disclosure.

FIG. 5 shows a method 500 for selecting appropriate tab-brackets for mounting a battery at an information handling system according to a specific embodiment of the present disclosure. At block 501, a free fall drop test of an information handling system including the presently disclosed tab-bracket and attached battery is performed. For example, a specification of an information handling system can specify that the information handling system can survive being dropped twenty-four inches onto a concrete floor. A drop test, perhaps including additional margin, can be conducted to verify that the battery remains secure in response to the shock experience by the information handling system during the drop test. At block 502, it is determined that a tab-bracket failed to withstand the free fall drop test. At block 503, an alternative tab-bracket is selected. For example, if a tab-bracket manufactured of galvanized steel fails the drop test of block 501, a tab-bracket made of carbon steel can be selected. At block 504, a battery is affixed to the alternative tab-brackets and the free fall drop test is repeated to determine the viability of the alternative tab-bracket.

Figure 6:
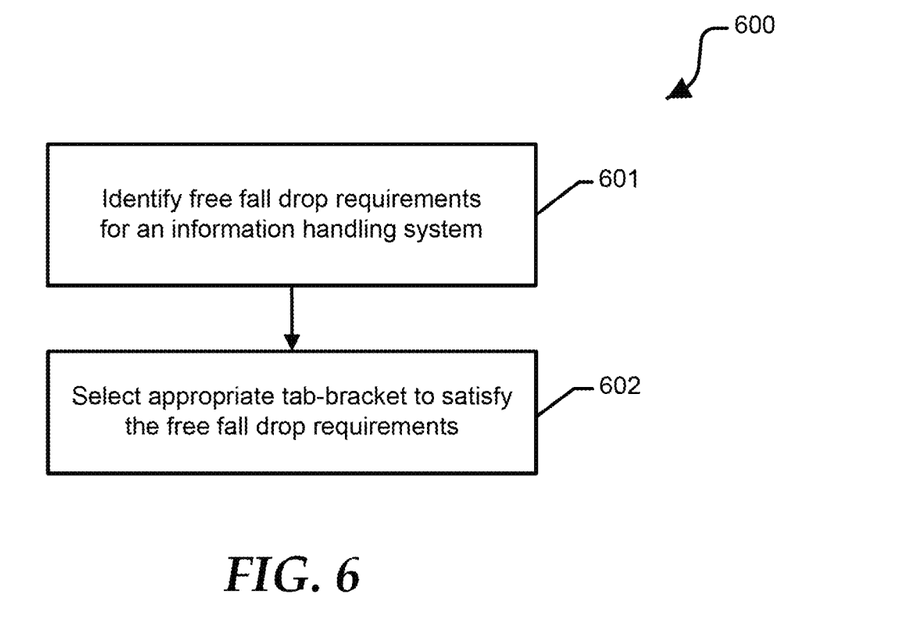
FIG. 6 is a flow diagram of a method for selecting appropriate tab-brackets for mounting a battery at an information handling system according to another embodiment of the present disclosure.

FIG. 6 shows a method 600 for selecting appropriate tab-brackets for mounting a battery at an information handling system according to another embodiment of the present disclosure. At block 601, free fall drop requirements for an information handling system are determined. For example, free fall drop specifications can vary across a product line. While an inexpensive consumer product may be designed to withstand minimal drop events, information handling systems designed for professional or industrial use may safely withstand more severe abuse. At block 602, appropriate tab-brackets are selected based on the free fall drop requirements. Factors influencing the selection include a mass of the battery, utilization of shock-absorbing materials to fabricate the housing and other internal chassis components of the information handling system, a number of tab-brackets used to secure the battery, and the like.

Figure 7:
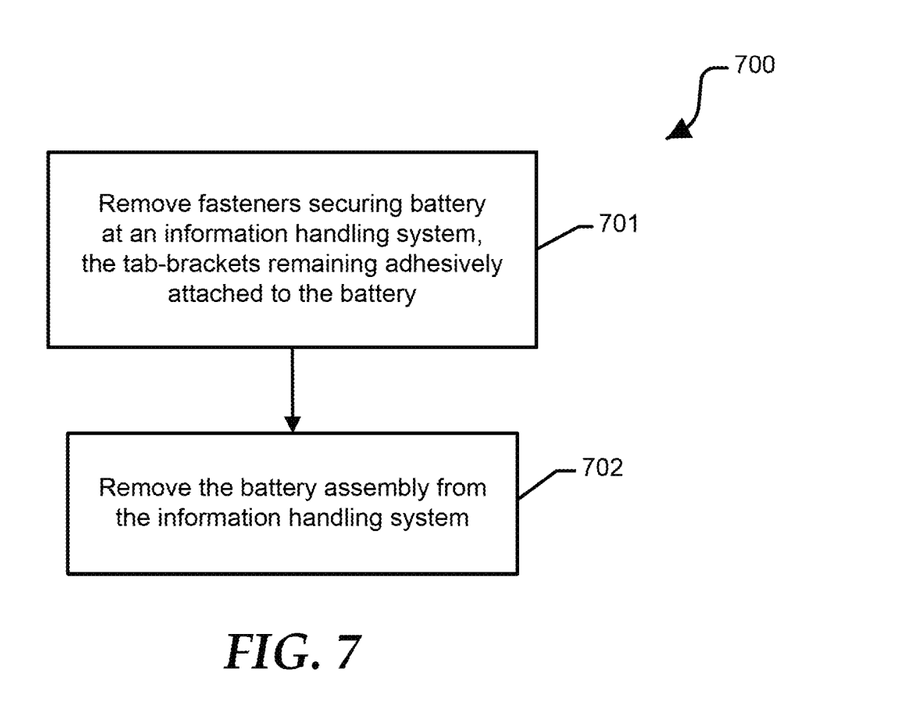
FIG. 7 is a flow diagram of a method for removing a battery at an information handling system according to a specific embodiment of the present disclosure.

FIG. 7 shows a method 700 for removing a battery at an information handling system according to a specific embodiment of the present disclosure. At block 701, fasteners securing a battery at an information handling system are removed. At block 702, the battery is removed from the information handling system. The tab-brackets remain adhesively attached to the battery after removal of the battery. The battery including the attached tab-brackets can be reinstalled or new tab-brackets and associated adhesive can be secured to the bosses, and a new battery can be affixed thereon.

Figure 8:
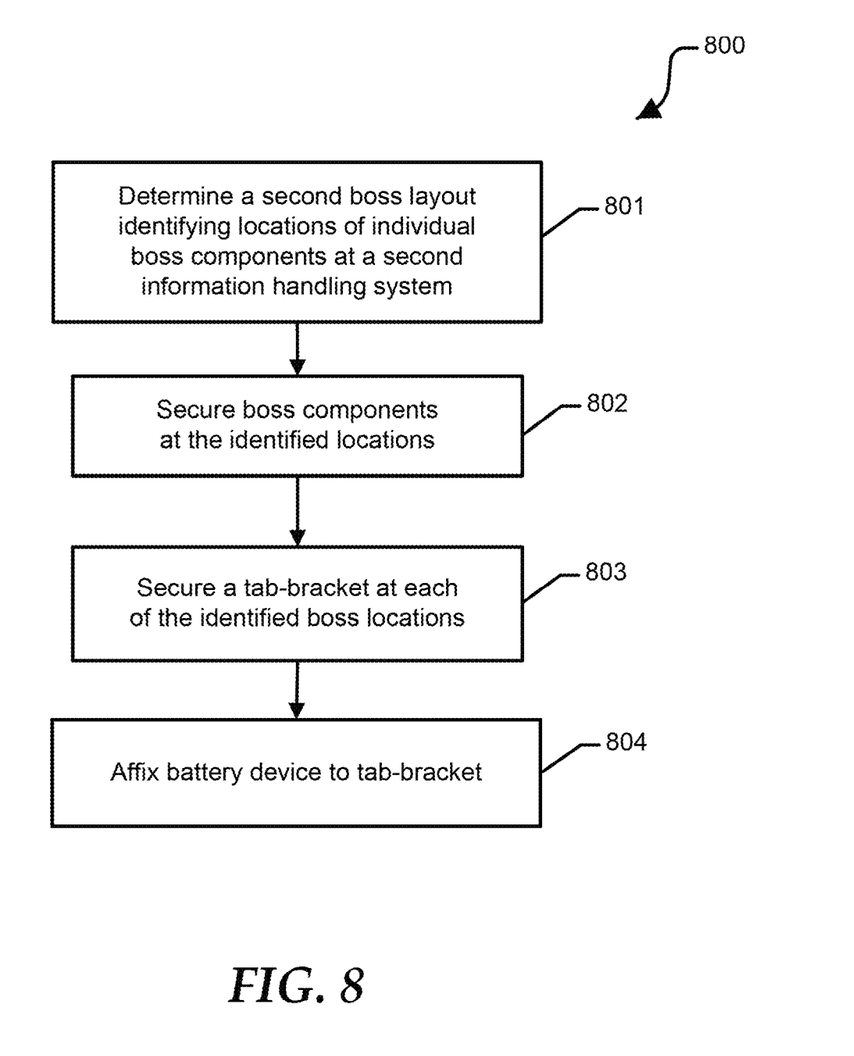
FIG. 8 is a flow diagram of a method for incorporating a particular battery at disparate information handling systems.

FIG. 8 shows a method 800 for incorporating a particular battery at disparate information handling systems. Batteries incorporated in laptop computers and similar information handling systems typically include plastic mounting tabs, and the laptop computer must include bosses at the specific locations defined by the tabs in order to mount the battery in the device. Two utilize a particular battery in another system, the boss locations must correspond to the predefined tab locations. The layout configuration of components at disparate systems typically is unique to each device, and likely precludes placing bosses at the locations corresponding to the battery tabs. Accordingly, it is common for each type of information handling system to require a proprietary battery that is designed specifically for that system. Therefore, the cost of development, manufacture, certification, and inventory stock is replicated for each battery style. Techniques disclosed herein facilitate incorporating a single battery model into multiple information handling systems, and the location of bosses can be optimized for each model. Method 400 of FIG. 4 shows how to incorporate a particular battery at a first information handling system. Method 800 shows how the same battery model can be incorporated at another system model.

Method 800 begins at block 801 where a second boss layout is determined, the second boss layout identifying locations of individual boss components at a second information handling system. At block 802, boss components are secured to a chassis component at the second information handling system. At block 803, a tab-bracket is secured to each of the boss components. As described above, an adhesive is provided at each tab-bracket. At block 804, a battery is affixed to the tab-bracket adhesive. The battery is the same model of battery installed at the information handling system of FIG. 4.

Figure 9:
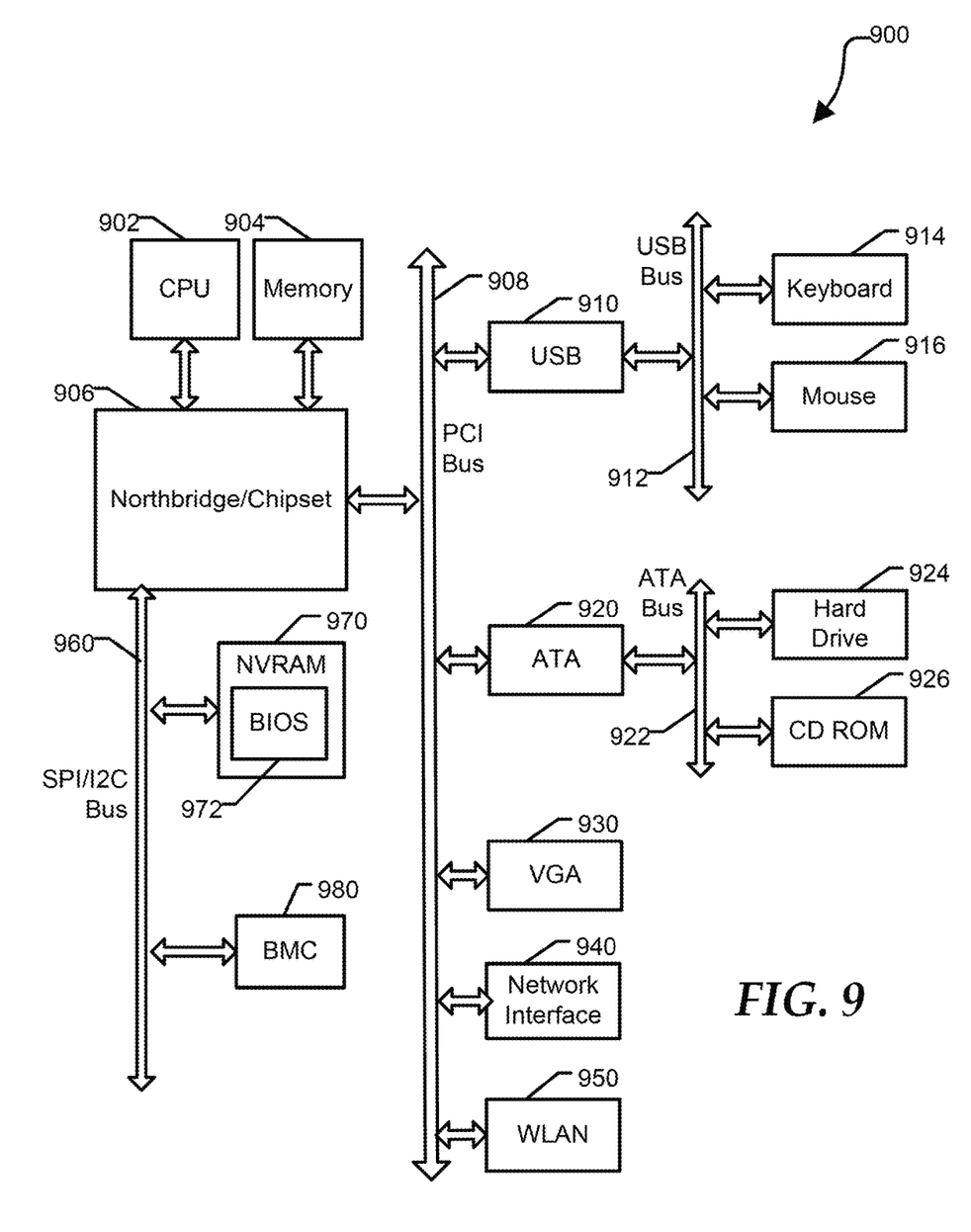
FIG. 9 is a block diagram of an information handling system according to an embodiment of the present disclosure.

FIG. 9 shows an information handling system 900 including a processor 902, a memory 904, a northbridge/chipset 906, a PCI bus 908, a universal serial bus (USB) controller 910, a USB 912, a keyboard device controller 914, a mouse device controller 916, a configuration an ATA bus controller 920, an ATA bus 922, a hard drive device controller 924, a compact disk read only memory (CD ROM) device controller 926, a video graphics array (VGA) device controller 930, a network interface controller (NIC) 940, a wireless local area network (WLAN) controller 950, a serial peripheral interface (SPI) bus 960, a NVRAM 970 for storing BIOS 972, and a baseboard management controller (BMC) 980. BMC 980 can be referred to as a service processor or embedded controller (EC). Capabilities and functions provided by BMC 980 can vary considerably based on the type of information handling system. For example, the term baseboard management system is often used to describe an embedded processor included at a server, while an embedded controller is more likely to be found in a consumer-level device. As disclosed herein, BMC 980 represents a processing device different from CPU 902, which provides various management functions for information handling system 900. For example, an embedded controller may be responsible for power management, cooling management, and the like. An embedded controller included at a data storage system can be referred to as a storage enclosure processor.

For purpose of this disclosure information handling system 900 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 900 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 900 can include processing resources for executing machine-executable code, such as CPU 902, a programmable logic array (PLA), an embedded device such as a System-on-a-Chip (SoC), or other control logic hardware. Information handling system 900 can also include one or more computer-readable medium for storing machine-executable code, such as software or data.

System 900 can include additional processors (not shown at FIG. 9) that are configured to provide localized or specific control functions, such as a battery management controller. Bus 960 can include one or more busses, including a SPI bus, an I2C bus, a system management bus (SMBUS), a power management bus (PMBUS), and the like. BMC 980 can be configured to provide out-of-band access to devices at information handling system 900. As used herein, out-of-band access herein refers to operations performed prior to execution of BIOS 972 by processor 902 to initialize operation of system 900. BIOS 972 can be referred to as a firmware image, and the term BIOS is herein used interchangeably with the term firmware image, or simply firmware. BIOS 972 includes instructions executable by CPU 902 to initialize and test the hardware components of system 900, and to load a boot loader or an operating system (OS) from a mass storage device. BIOS 972 additionally provides an abstraction layer for the hardware, i.e. a consistent way for application programs and operating systems to interact with the keyboard, display, and other input/output devices. When power is first applied to information handling system 900, the system begins a sequence of initialization procedures. During the initialization sequence, also referred to as a boot sequence, components of system 900 are configured and enabled for operation, and device drivers can be installed. Device drivers provide an interface through which other components of the system 900 can communicate with a corresponding device.

Information handling system 900 can include additional components and additional busses, not shown for clarity. For example, system 900 can include multiple processor cores, audio devices, and the like. While a particular arrangement of bus technologies and interconnections is illustrated for the purpose of example, one of skill will appreciate that the techniques disclosed herein are applicable to other system architectures. System 900 can include multiple CPUs and redundant bus controllers. One or more components can be integrated together. For example, portions of northbridge/chipset 906 can be integrated within CPU 902. Additional components of information handling system 900 can include one or more storage devices that can store machine-executable code, one or more communications ports for communicating with external devices, and various input and output (I/O) devices, such as a keyboard, a mouse, and a video display. An example of information handling system 900 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 900 can include a set of instructions that can be executed to cause the information handling system to perform any one or more of the methods or computer based functions disclosed herein. The information handling system 900 may operate as a standalone device or may be connected to other computer systems or peripheral devices, such as by a network.

In a networked deployment, the information handling system 900 may operate in the capacity of a server or as a client user computer in a server-client user network environment, or as a peer computer system in a peer-to-peer (or distributed) network environment. The information handling system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single information handling system 900 is illustrated, the term "system" shall also be taken to include any collection of systems or sub-systems that individually or jointly execute a set, or multiple sets, of instructions to perform one or more computer functions.

The information handling system 900 can include a disk drive unit and may include a computer-readable medium, not shown in FIG. 9, in which one or more sets of instructions, such as software, can be embedded. Further, the instructions may embody one or more of the methods or logic as described herein. In a particular embodiment, the instructions may reside completely, or at least partially, within system memory 904 or another memory included at system 900, and/or within the processor 902 during execution by the information handling system 900. The system memory 904 and the processor 902 also may include computer-readable media.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   determining a first boss layout at a chassis assembly of an information handling system based on physical dimensions of a first battery, the boss layout identifying locations of individual boss components;
   securing a first boss component at a first identified location of chassis assembly;
   securing a second boss component at a second identified location of the chassis assembly;
   securing a first tab-bracket to the first boss component, the first tab-bracket including a portion having an adhesive applied thereon;
   securing a second tab-bracket to the second boss component, the second tab-bracket including a portion having the adhesive applied thereon; and
   affixing the first battery to the adhesive at the first and second tab-brackets.

2. The method of claim 1, further comprising:
   determining a second boss layout at a chassis assembly of a second information handling system, the second boss layout identifying locations of individual boss components, the second boss layout different than the first boss layout;
   securing boss components the chassis assembly of at the second information handling system based on the second boss layout;
   securing a tab-bracket insert of the second information handling system at each of the boss components of the second information handling system, the tab-brackets of the second information handling system including a portion having the adhesive applied thereon; and
   affixing a second battery to the adhesive at the tab-brackets of the second information handling system.

3. The method of claim 1, further comprising applying the adhesive to the first tab-bracket after securing the first tab-bracket at the first boss component.

4. The method of claim 1, further comprising applying the adhesive to the first tab-bracket before securing the first tab-bracket at the first boss component.

5. The method of claim 1, wherein the adhesive is initially covered by a protective material, the method further comprising removing the protective material before affixing the first battery to the adhesive.

6. The method of claim 1, further comprising:
   performing a free fall drop test of the information handling system and affixed battery;
   determining that the first tab-bracket failed to withstand the free fall drop test; and
   selecting an alternative tab-bracket from a plurality of tab-bracket components, the alternative tab-bracket having physical characteristics different than physical characteristics of the first tab-bracket.

7. The method of claim 1, further comprising selecting the first tab-bracket from a plurality of alternative tab-brackets having different physical characteristics, the selecting based on a free fall drop specification of the information handling system.

8. The method of claim 1, wherein the first and second tab-brackets comprise a metal.

9. The method of claim 1, further comprising selecting the first tab-bracket from a plurality of alternative tab-brackets based on a thickness of metal used to fabricate the tab-brackets.

10. The method of claim 1, further comprising selecting the first tab-bracket from a plurality of alternative tab brackets based on a tensile strength of each of the alternative tab-brackets.

11. The method of claim 1, wherein the first tab-bracket includes a first opening to receive a threaded fastener and a second opening to receive an alignment pin included at the first boss component.

12. An information handling system comprising:
   a chassis assembly;
   a first boss component secured to the chassis assembly;
   a second boss component secured to the chassis assembly;
   a first tab-bracket secured to the first boss component, the first tab-bracket including a portion having adhesive applied thereon;
   a second tab bracket secured to the second boss component, the tab-bracket including a portion having adhesive applied thereon; and
   a battery affixed to the adhesive at the first tab-bracket and to the adhesive at the second tab-bracket, the battery affixed to the adhesive at the first and the second tab-bracket after the first tab-bracket is secured to the first boss component and the second tab-bracket is secured to the second boss component.

13. The information handling system of claim 12, wherein the battery is affixed to the adhesive at the first tab-bracket and to the adhesive at the second tab-bracket when locations of the first and the second boss components correspond to a first boss layout and when the locations of the first and second boss component correspond to a second boss layout, the first and second boss layouts identifying locations of boss components, the second boss layout different than the first boss layout being.

14. The information handling system of claim 12, wherein a location of the first boss component and a location of the second boss component are determined based on arrangement of other components at the chassis assembly.

15. The information handling system of claim 12, wherein the adhesive is applied to the first tab-bracket after securing the first tab-bracket at the first boss component.

16. The information handling system of claim 12, wherein the adhesive is applied to the first tab-bracket before securing the first tab-bracket at the first boss component.

17. The information handling system of claim 12, wherein the first tab-bracket is selected from a plurality of alternative tab-brackets having different physical characteristics based on a free fall drop specification of the information handling system.

18. The information handling system of claim 12, wherein the first tab-bracket includes a first opening to receive a threaded fastener and a second opening to receive an alignment pin included at the first boss component.

19. A method comprising:
   determining a first boss layout at a first chassis assembly of at a first information handling system, the first boss layout determined based on a first battery having first physical dimensions;
   determining a second boss layout at a second chassis assembly of a second information handling system, the second boss layout determined based on a second battery having the first physical dimensions;
   securing bosses at the first chassis assembly according to the first boss layout;
   securing bosses at the second chassis assembly according to the second boss layout;
   securing a first tab-bracket at a first boss at the first chassis assembly, the first tab-bracket including a portion having an adhesive applied thereon;
   securing a second tab-bracket at a first boss at the second chassis assembly, the second tab-bracket including a portion having an adhesive applied thereon;
   affixing the first battery to the adhesive at the first tab-bracket; and
   affixing the second battery to the adhesive at the second tab-bracket.

20. The method of claim 19, further comprising:
   selecting the first tab-bracket from a plurality of alternative tab-brackets having different physical characteristics, the selecting based on a free fall drop specification of the first information handling system; and
   selecting the second tab-bracket from the plurality of alternative tab-brackets based on a free fall drop specification of the second information handling system, the free fall drop specification of the second information handling system being different than the free fall drop specification of the first information handling system.

* * * * *

UNITED STATES PATENT AND TRADEMARK OFFICE
CERTIFICATE OF CORRECTION

PATENT NO. : 10,613,583 B2
APPLICATION NO. : 15/858835
DATED : April 7, 2020
INVENTOR(S) : Yao-Tsung Chang et al.

Page 1 of 1

It is certified that error appears in the above-identified patent and that said Letters Patent is hereby corrected as shown below:

In the Claims

Column 11, Line 5-6: Please change "the second boss layout different than the first boss layout being." to -- the second boss layout being different than the first boss layout. --

Column 11, Line 28: Please change "of at a" to -- of a --

Signed and Sealed this
Ninth Day of June, 2020

Andrei Iancu
*Director of the United States Patent and Trademark Office*